US012380012B2

United States Patent
Mukherjee et al.

(10) Patent No.: US 12,380,012 B2
(45) Date of Patent: Aug. 5, 2025

(54) HYBRID NEURAL NETWORK FOR PREVENTING SYSTEM FAILURE

(71) Applicant: Bank of America Corporation, Charlotte, NC (US)

(72) Inventors: Maharaj Mukherjee, Poughkeepsie, NY (US); Vidya Srikanth, Sunnyvale, CA (US); Utkarsh Raj, Charlotte, NC (US); Carl M. Benda, Charlotte, NC (US); Elvis Nyamwange, Little Elm, TX (US); Suman Roy Choudhury, Jersey City, NJ (US)

(73) Assignee: Bank of America Corporation, Charlotte, NC (US)

( * ) Notice: Subject to any disclaimer, the term of this patent is extended or adjusted under 35 U.S.C. 154(b) by 459 days.

(21) Appl. No.: 17/879,930

(22) Filed: Aug. 3, 2022

(65) Prior Publication Data
US 2024/0045784 A1 Feb. 8, 2024

(51) Int. Cl.
G06F 11/34 (2006.01)
G06F 9/50 (2006.01)
G06F 11/07 (2006.01)

(52) U.S. Cl.
CPC ........ G06F 11/3442 (2013.01); G06F 9/5083 (2013.01); G06F 11/0769 (2013.01)

(58) Field of Classification Search
CPC ............... G06F 11/3442; G06F 9/5083; G06F 11/0778; G06F 11/3058; G06F 11/3409
See application file for complete search history.

(56) References Cited

U.S. PATENT DOCUMENTS

| | | | |
|---|---|---|---|
| 7,050,936 B2 | 5/2006 | Levy et al. |
| 7,225,368 B2 | 5/2007 | Lancaster |
| 7,287,396 B2 | 10/2007 | Maier et al. |
| 7,349,826 B2 | 3/2008 | Subramanian et al. |
| 7,539,907 B1 | 5/2009 | Johnsen et al. |
| 7,669,432 B2 | 3/2010 | Maier et al. |
| 8,189,484 B2 | 5/2012 | Reich, Jr. |
| 8,402,322 B2 | 3/2013 | Herz et al. |
| 9,122,643 B2 | 9/2015 | Herz et al. |
| 9,556,002 B2 | 1/2017 | Wilke et al. |
| 10,025,337 B2 | 7/2018 | Hancock et al. |
| 10,095,665 B2 | 10/2018 | Cardno |

(Continued)

Primary Examiner — Benjamin C Wu
(74) Attorney, Agent, or Firm — Banner & Witcoff, Ltd.

(57) ABSTRACT

Aspects of the disclosure relate to outage prevention. A computing platform may train, using historical parameter information and historical outage information, an outage prediction model. The computing platform may receive, from at least one system, current parameter information, and may normalize the current parameter information. The computing platform may convert, using a CNN of the outage prediction model, the normalized current parameter information to a frequency domain. The computing platform may input, into at least one RNN of the outage prediction model, the frequency domain information, to produce a likelihood of outage score. The computing platform may compare the likelihood of outage score to a predetermined outage threshold. Based on identifying that the likelihood of outage score meets or exceeds the predetermined outage threshold, the computing platform may direct the at least one system to execute a performance modification to prevent a predicted outage.

20 Claims, 8 Drawing Sheets

(56) References Cited

U.S. PATENT DOCUMENTS

| | | |
|---|---|---|
| 10,240,408 B2 | 3/2019 | Finlay et al. |
| 10,565,329 B2 | 2/2020 | Greenwood |
| 10,597,953 B2 | 3/2020 | Finlay et al. |
| 10,628,537 B2 | 4/2020 | Van der Velden et al. |
| 10,677,487 B2 | 6/2020 | Apsangi |
| 10,707,921 B2 | 7/2020 | Dvorsky et al. |
| 10,733,077 B2 | 8/2020 | Menon et al. |
| 10,769,325 B2 | 9/2020 | Van der Velden et al. |
| 11,015,403 B2 | 5/2021 | Finlay et al. |
| 11,159,205 B2 | 10/2021 | Dvorsky et al. |
| 11,171,688 B2 | 11/2021 | Dvorsky et al. |
| 12,211,325 B1* | 1/2025 | Chappell ................ G07C 5/008 |
| 12,233,789 B2* | 2/2025 | Du ......................... G06N 3/044 |
| 12,251,165 B2* | 3/2025 | Mosnier ............. A61B 17/7013 |
| 2019/0205232 A1* | 7/2019 | Ayyagari ............ G06F 11/2205 |
| 2020/0027026 A1* | 1/2020 | Cook ....................... G06N 3/04 |
| 2021/0334656 A1* | 10/2021 | Sjögren ................. G06N 3/048 |
| 2021/0383206 A1* | 12/2021 | Teppoeva ............. G06F 11/004 |
| 2022/0405193 A1* | 12/2022 | Ashok ................... G06F 11/004 |
| 2023/0195094 A1* | 6/2023 | Hu ........................... H04R 1/08 |
| | | 702/183 |
| 2023/0306318 A1* | 9/2023 | Garg ...................... G06Q 10/04 |
| 2024/0045784 A1* | 2/2024 | Mukherjee .......... G06F 11/0769 |
| 2024/0289610 A1* | 8/2024 | Wang ................. H03H 17/0257 |
| 2024/0315632 A1* | 9/2024 | de Bie ................... A61B 5/361 |
| 2024/0385917 A1* | 11/2024 | Mukherjee ........... G06V 10/764 |
| 2024/0393262 A1* | 11/2024 | Hong ................. G01N 21/9503 |
| 2025/0068495 A1* | 2/2025 | Fu ....................... G06F 11/0793 |

* cited by examiner

HYBRID NEURAL NETWORK FOR PREVENTING SYSTEM FAILURE

BACKGROUND

Aspects of the disclosure relate to outage prevention. In some cases, due to limited computing resources, processing power, and/or other limitations, infrastructure and/or technology outages may occur. Such outages may result in mandatory downtime and/or otherwise cause processing delays. Once an outage occurs, individuals such as systems analysts, network administrators, internet technology professionals, and/or others may work to resolve the causes of the outage and subsequently bring the systems back online (or to transfer load as needed). While ultimately effective in retroactively addressing the outages, such methods may result in unwarranted time delays, costs, and/or downtime. Accordingly, it may be advantageous to avoid such outages all together.

SUMMARY

Aspects of the disclosure provide effective, efficient, scalable, and convenient technical solutions that address and overcome the technical problems associated with outage prediction and prevention. In accordance with one or more embodiments of the disclosure, a computing platform comprising at least one processor, a communication interface, and memory storing computer-readable instructions may train, using historical parameter information and historical outage information, an outage prediction model configured to identify likelihood of outage scores, indicating likelihoods of at least one system experiencing an outage within a predetermined period of time, where the outage prediction model may include a convolutional neural network (CNN) and at least one recurrent neural network (RNN). The computing platform may receive, from the at least one system, current parameter information. The computing platform may normalize the current parameter information to provide a uniform format for each type of parameter information of the current parameter information. The computing platform may convert, using the CNN of the outage prediction model, the normalized current parameter information from a geometric domain to a frequency domain. The computing platform may input, into the at least one RNN of the outage prediction model, the frequency domain normalized current parameter information, to produce a likelihood of outage score for the at least one system. The computing platform may compare the likelihood of outage score for the at least one system to a predetermined outage threshold. Based on identifying that the likelihood of outage score meets or exceeds the predetermined outage threshold, the computing platform may send one or more commands directing the at least one system to execute a performance modification to prevent a predicted outage, which may cause the at least one system to execute the performance modification.

In one or more instances, the historical parameter information and the current parameter information may indicate one or more of: computer processing unit (CPU) Fahrenheit/ Celsius value, CPU load, cache usage, memory usage, and/or other information. In one or more instances, the computing platform may normalize, prior to inputting the historical parameter information into the outage prediction model, the historical parameter information.

In one or more examples, normalizing the historical parameter information and the current parameter information may include configuring all types of parameter information included in the historical parameter information and the current parameter information with a uniform format, where all of the types of the parameter information may be directly compared to each other once converted to the uniform format. In one or more instances, the uniform format may be a percentage.

In one or more instances, the at least one RNN may be trained to identify matching patterns between the historical parameter information and the current parameter information, by identifying at least one matching progression of changes in one or more parameters. In one or more instances, the at least one matching progression of changes may include changes in parameters at different systems.

In one or more examples, the at least one RNN may be trained to identify a subset of the matching patterns that correspond to the historical outage information, and the likelihood of outage score may be produced based on whether or not any of the identified matching patterns correspond to the historical outage information. In one or more examples, the computing platform may identify, using the outage prediction model, the performance modification, where identifying the performance modification may include identifying a historical performance modification that was executed in response to previous identification of the corresponding identified matching pattern.

In one or more instances, the outage prediction model may be configured to identify the likelihood of outage scores based on a plurality of parameters across a plurality of systems. In one or more instances, sending one or more commands directing the at least one system to execute the performance modification may cause the at least one system to reduce a CPU Fahrenheit/Celsius value, reduce a CPU load, reduce a cache usage, reduce a memory usage, and/or perform other actions. In one or more instances, the one or more commands may be sent to a load balancing system, different than the at least one system.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure describe performing multi-dimensional image analytics using a hybrid neural network to detect technology infrastructure conditions and/or to prevent system failures. For example, preventable technology infrastructure outages have been experienced. While teams may be highly reactive in handling outages, there is an opportunity to prevent them in a proactive manner.

Accordingly, described herein is a multi-dimensional image space that uses machine condition features such as computer processing units (CPU), memory load, cache, CPU Fahrenheit/Celsius value, and/or other features. These features may be normalized to make them dimensionless, and fast Fourier transform (FFT), discrete Fourier transform (DFT), and/or other methods may be used to convert the features to the frequency domain. A convolution neural network (CNN) may be used to perform pattern recognition for time snap shots. These patterns may be fed through a recurrent neural network (RNN) to decide whether the series of the patterns are indicative of future failures. Mitigation actions may then be performed to correct for any predicted failures.

Figure 1A:
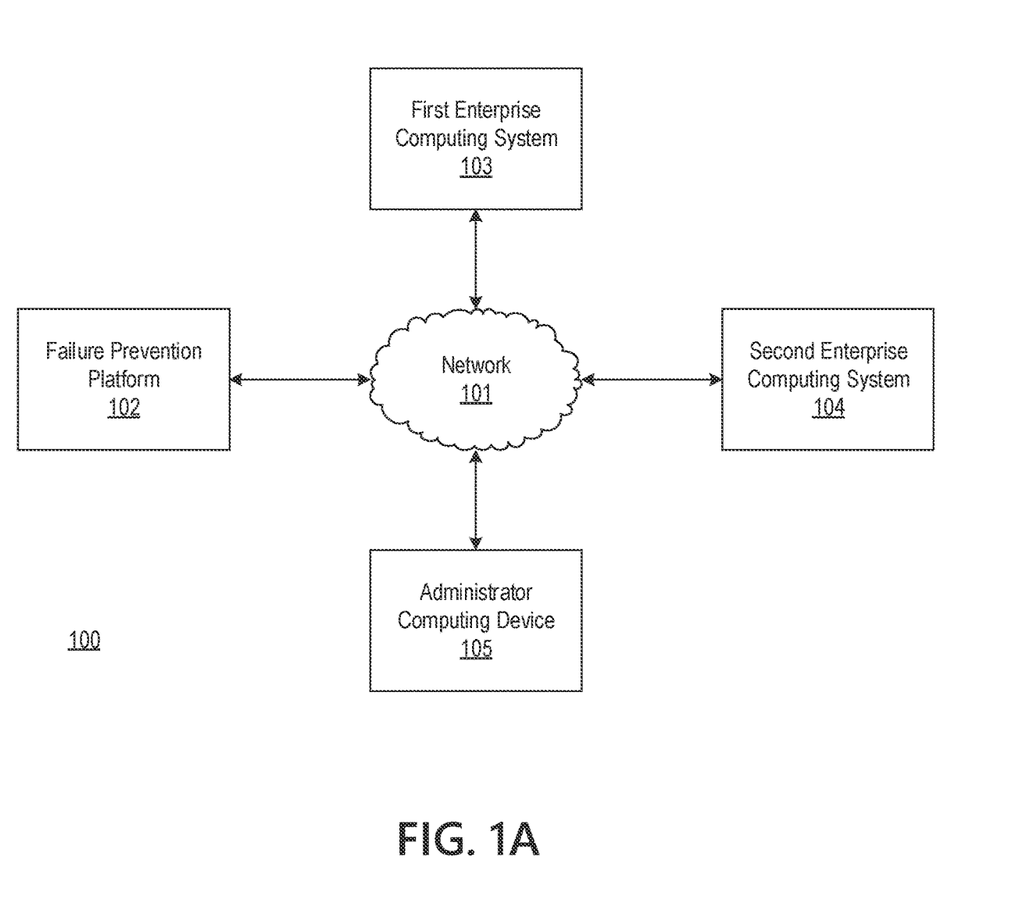
FIGS. 1A-1B depict an illustrative computing environment for implementing a hybrid neural network for preventing system failure in accordance with one or more example embodiments.
Figure 1B:
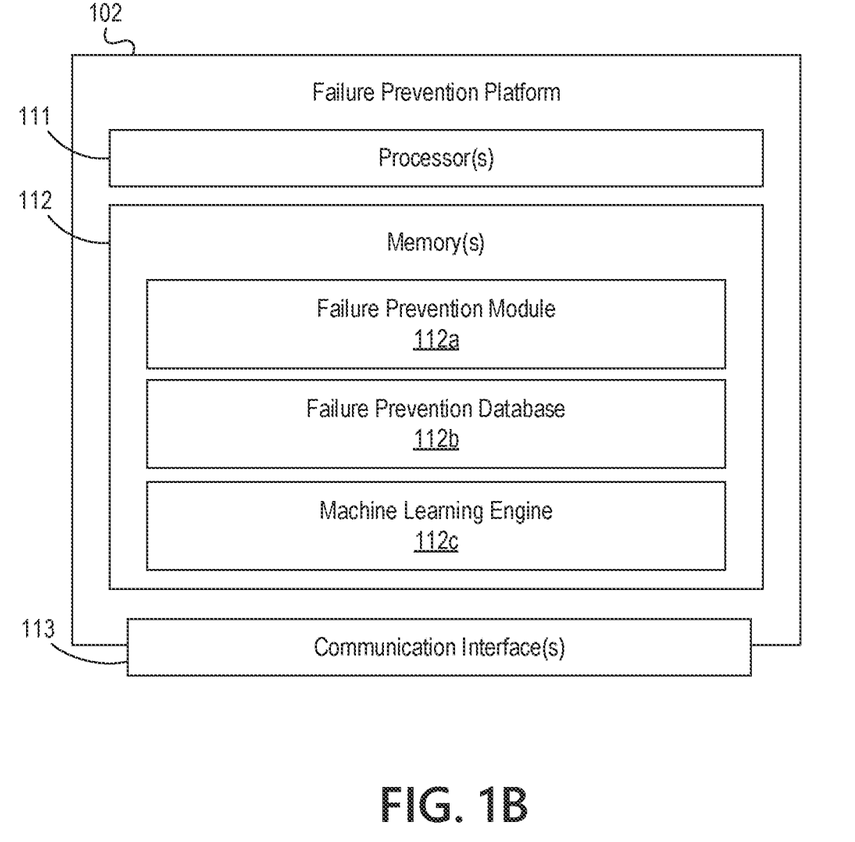

FIGS. 1A-1B depict an illustrative computing environment implementing a hybrid neural network for preventing system failure in accordance with one or more example embodiments. Referring to FIG. 1A, computing environment 100 may include one or more computer systems. For example, computing environment 100 may include a failure prevention platform 102, first enterprise computing system 103, second enterprise computing system 104, and administrator computing device 105.

As described further below, failure prevention platform 102 may be a computer system that includes one or more computing devices (e.g., servers, server blades, or the like) and/or other computer components (e.g., processors, memories, communication interfaces) that may be used to train, host, and/or otherwise refine a failure prediction model, which may, e.g., include a CNN configured for frequency domain conversion and pattern recognition, and one or more RNNs configured to identify whether any of the identified patterns are indicative of a future system failure.

First enterprise computing system 103 may be a server, server blade, mobile device, tablet, smartphone, desktop computer, laptop computer, and/or other device/computing component that may be used to perform one or more enterprise actions, functions, or the like. In some instances, the first enterprise computing system 103 may be configured to support operating functions of a corresponding enterprise.

Second enterprise computing system 104 may be a server, server blade, mobile device, tablet, smartphone, desktop computer, laptop computer, and/or other device/computing component that may be used to perform one or more enterprise actions, functions, or the like. In some instances, the second enterprise computing system 104 may be configured to support operating functions of a corresponding enterprise.

Administrator computing device 105 may be a mobile device, tablet, smartphone, desktop computer, laptop computer, and/or other device that may be used by an individual (such as a system administrator or other information technology professional) to monitor performance and/or conditions of a network and/or corresponding systems. In some instances, the administrator computing device 105 may be configured to provide one or more user interfaces (e.g., failure notification interfaces, or the like).

Computing environment 100 also may include one or more networks, which may interconnect failure prevention platform 102, first enterprise computing system 103, second enterprise computing system 104, administrator computing device 105, or the like. For example, computing environment 100 may include a network 101 (which may interconnect, e.g., failure prevention platform 102, first enterprise computing system 103, second enterprise computing system 104, administrator computing device 105, or the like).

In one or more arrangements, failure prevention platform 102, first enterprise computing system 103, second enterprise computing system 104, and/or administrator computing device 105 may be any type of computing device capable of sending and/or receiving requests and processing the requests accordingly. For example, failure prevention platform 102, first enterprise computing system 103, second enterprise computing system 104, administrator computing device 105, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of failure prevention platform 102, first enterprise computing system 103, second enterprise computing system 104, and/or administrator computing device 105 may, in some instances, be special-purpose computing devices configured to perform specific functions.

Although FIG. 1A depicts only a first enterprise computing system 103 and a second enterprise computing system 104, this is for illustrative purposes only, and any number of enterprise computing systems may be included in the system environment without departing from the scope of the disclosure.

Referring to FIG. 1B, failure prevention platform 102 may include one or more processors 111, memory 112, and communication interface 113. A data bus may interconnect processor 111, memory 112, and communication interface 113. Communication interface 113 may be a network interface configured to support communication between failure prevention platform 102 and one or more networks (e.g., network 101, or the like). Memory 112 may include one or more program modules having instructions that when executed by processor 111 cause failure prevention platform 102 to perform one or more functions described herein and/or one or more databases that may store and/or otherwise maintain information which may be used by such program modules and/or processor 111. In some instances, the one or more program modules and/or databases may be stored by and/or maintained in different memory units of failure prevention platform 102 and/or by different computing devices that may form and/or otherwise make up failure prevention platform 102. For example, memory 112 may have, host, store, and/or include failure prevention module 112a, failure prevention database 112b, and machine learning engine 112c.

Failure prevention module 112*a* may have instructions that direct and/or cause failure prevention platform 102 to execute advanced techniques to identify and prevent potential system failures. Failure prevention database 112*b* may store information used by failure prevention module 112*a* and/or failure prevention platform 102 in application of advanced techniques to identify and/or prevent potential system failures, and/or in performing other functions. Machine learning engine 112*c* may be used to dynamically refine abilities of the failure prevention platform 102 to identify and prevent potential system failures.

Figure 2A:
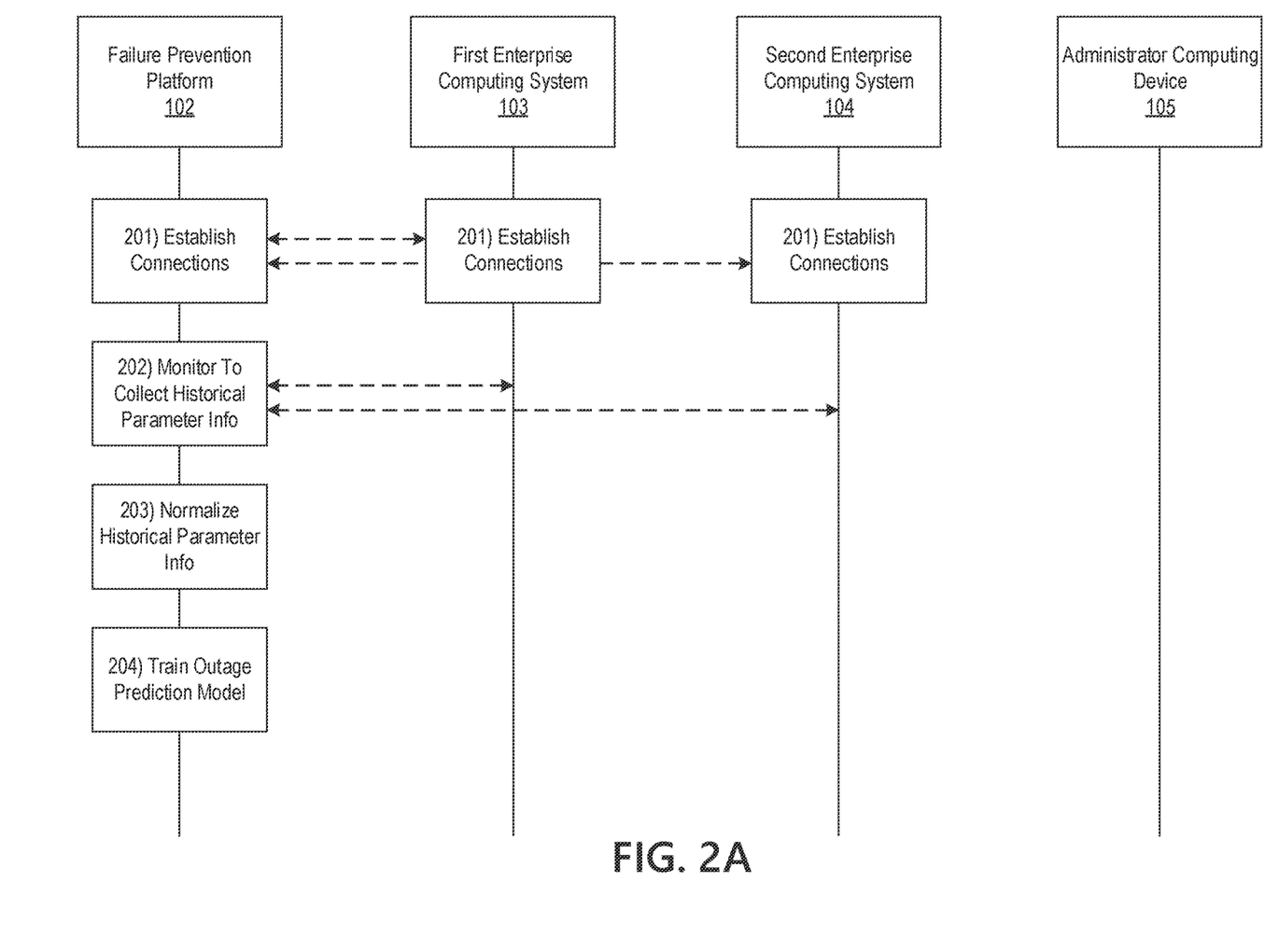
FIGS. 2A-2D depict an illustrative event sequence for implementing a hybrid neural network for preventing system failure in accordance with one or more example embodiments.

FIGS. 2A-2D depict an illustrative event sequence for implementing a hybrid neural network for preventing system failure in accordance with one or more example embodiments. Referring to FIG. 2A, at step 201, the failure prevention platform 102 may establish a connection with the first enterprise computing system 103 and/or the second enterprise computing system 104. For example, the failure prevention platform 102 may establish first and/or second wireless data connections with the first enterprise computing system 103 and/or the second enterprise computing system 104 to link the failure prevention platform 102 to the first enterprise computing system 103 and/or the second enterprise computing system 104 (e.g., in preparation for monitoring these systems). In some instances, the failure prevention platform 102 may identify whether connections are already established with the first enterprise computing system 103 and/or the second enterprise computing system 104. If so, the failure prevention platform 102 might not re-establish the connections. If not, the failure prevention platform 102 may establish the first and/or second wireless data connections as described herein.

At step 202, the failure prevention platform 102 may monitor the first enterprise computing system 103 and/or the second enterprise computing system 104 to collect historical parameter and failure information. For example, the failure prevention platform 102 may collect computer processing unit (CPU) Fahrenheit/Celsius value, CPU load, cache usage, memory usage, and/or other information, and may also receive failure information indicating whether or not a system failure was experienced at various values of such parameters. In some instances, in collecting such historical parameter information, the failure prevention platform 102 may collect parameter values with different timescales, which might not be directly comparable (e.g., CPU Fahrenheit/Celsius values might not be directly comparable to memory usage values). In doing so, the failure prevention platform 102 may collect multidimensional parameter information for each of a plurality of computing systems (e.g., first enterprise computing system 103, second enterprise computing system 104, and/or other computing systems). In some instances, the failure prevention platform 102 may monitor the first enterprise computing system 103 and/or the second enterprise computing system 104 while the first and/or second wireless data connections are established.

At step 203, the failure prevention platform 102 may normalize the historical parameter information (collected at step 202). For example, as noted above, the historical parameter information may be multi-dimensional and/or correspond to various timescales. Accordingly, the failure prevention platform 102 may normalize the historical parameter values into a uniform format, so as to make different types of parameter values directly comparable to each other. For example, the failure prevention platform 102 may convert the historical parameter information to percentages. Specifically, the failure prevention platform 102 may transform the CPU Fahrenheit/Celsius values into a percent of maximum CPU Fahrenheit/Celsius values. Similarly, the failure prevention platform 102 may transform the cache and/or memory usage values into a percent of available cache/memory being used. In doing so, such percentages may be directly compared to each other for failure analysis (e.g., Fahrenheit/Celsius values may be compared to usage values, etc.).

At step 204, the failure prevention platform 102 may train an outage prediction model to predict a likelihood of a system failure or outage based on current parameter information. For example, the failure prevention platform 102 may input the normalized historical parameter information and failure information into the outage prediction model to train a CNN and one or more RNNs.

For example, in training the CNN, the failure prevention platform 102 may store pattern information between the historical parameter information. For example, the failure prevention platform 102 may store pattern information indicating which parameter values occurred together, before each other, after each other, and/or otherwise. In some instances, to do so, the failure prevention platform 102 may convert the normalized historical pattern information to a frequency domain and may store the pattern information as frequency values.

In training the one or more RNNs, the failure prevention platform 102 may store information indicating which patterns, identified by the CNN, correspond to the failure information. In some instances, various RNNs may be trained to identify stages prior to a given failure. For example, on a first day the CPU usage may have risen to a first percentage value, on a second day the CPU Fahrenheit/Celsius values may have risen to a particular percentage value, and on a third day the corresponding system mail fail. In instances such as this, a first RNN may be trained to identify parameters at a first time, a second RNN may be trained to identify parameters at a second time, etc. In some instances, each of the one or more RNNs may be trained for a given parameter type. In training the outage prediction model to comprise both the CNN and RNNs, the failure prevention platform 102 may train the outage prediction model to predict failures not only based on values at a particular time (e.g., a time×the Fahrenheit/Celsius value exceeds a threshold), but rather, the outage prediction model may be trained based on parameter patterns (e.g., patterns at a single system, patterns at different systems, patterns in a single parameter, patterns in different parameters, and/or other patterns) leading up to such failures, which may, e.g., increase accuracy of the outage prediction model in predicting failures.

Figure 2B:
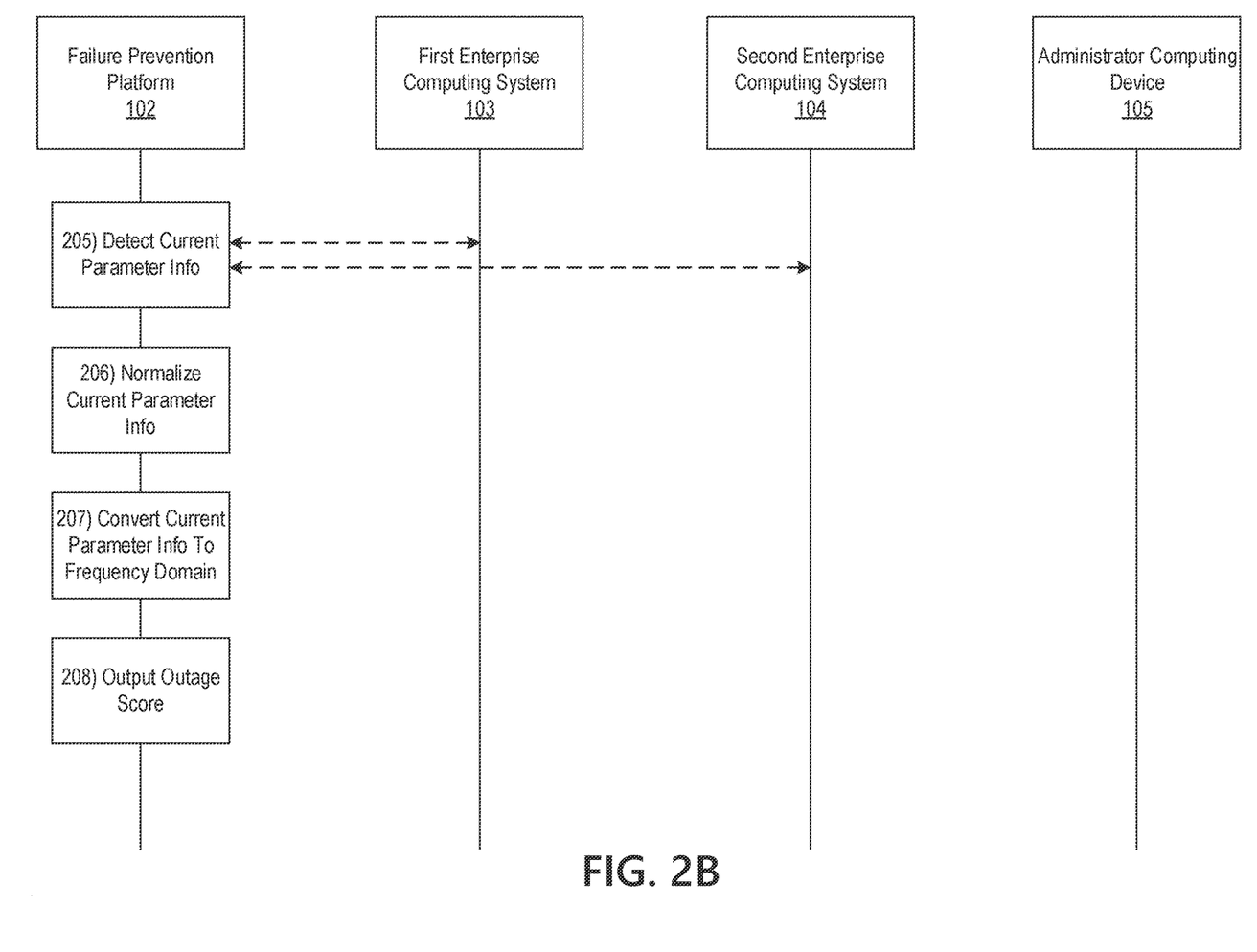

Referring to FIG. 2B, at step 205, the failure prevention platform 102 may monitor the first enterprise computing system 103 and/or the second enterprise computing system 104 to detect current parameter information, which may, e.g., be similar data to that described above with regard to the historical parameter information at step 202, but may, e.g., be occurring in substantially real time rather than in the past.

At step 206, the failure prevention platform 102 may normalize the current parameter information detected at step 205. For example, the failure prevention platform 102 may perform similar actions to those described above at step 203 with regard to normalizing the historical parameter information.

At step 207, the failure prevention platform 102 may convert the current parameter information to the frequency domain. For example, the failure prevention platform 102 may use a FFT and/or DFT to convert the current parameter information. In doing so, the failure prevention platform 102 may configure the current parameter information for input into the CNN of the outage prediction model. The failure prevention platform 102 may then input the frequency domain current parameter information into the CNN of the outage prediction model, which may perform pattern recognition based on the historical parameter information and failure information. In doing so, the failure prevention platform 102 may identify, for particular time instants, whether or not the parameter conditions match a pattern linked to a historical outage or failure. For example, the CNN may identify that the CPU Fahrenheit/Celsius value has reached a percentage value corresponding to historical outage/failure.

At step 208, the failure prevention platform 102 may output a likelihood of outage score, indicating a likelihood that an outage will occur within a predetermined time period (e.g., 1 day, 1 hour, or the like). For instance, the failure prevention platform 102 may further feed the frequency domain current parameter information into one or more RNNs for pattern recognition across periods of time (e.g., rather than merely a particular time instant as described with regard to the CNN). For example, the RNNs may identify that CPU usage percentage for a system at a first time and CPU Fahrenheit/Celsius value percentage at a second time matches a pattern corresponding to historical outage or failure (which might not have otherwise been detected as leading to an outage by the CNNs time instant analysis alone).

In some instances, in identifying the matching patterns, the one or more RNNs may identify matching progressions of changes in one or more parameters for a single system and/or different systems. In these instances, the changes in the one or more parameters may be changes in the same parameter (e.g., changes in Fahrenheit/Celsius values) and/or changes in different parameters (e.g., change in usage followed by change in Fahrenheit/Celsius values).

Based on the results of the CNN and the RNN, the failure prevention platform 102 may output the likelihood of outage score, indicating a likelihood that an outage will occur within a predetermined time period (e.g., 1 day, 1 hour, or the like). For example, if at least one failure is predicted, the failure prevention platform 102 may output a score of 1. In contrast, if no failures are predicted, the failure prevention platform 102 may output a score of 0. In some instances, higher scores may be output in instances where the predetermined time period is shorter. For example, higher score may indicate higher urgency of addressing the potentially outage.

Figure 2C:
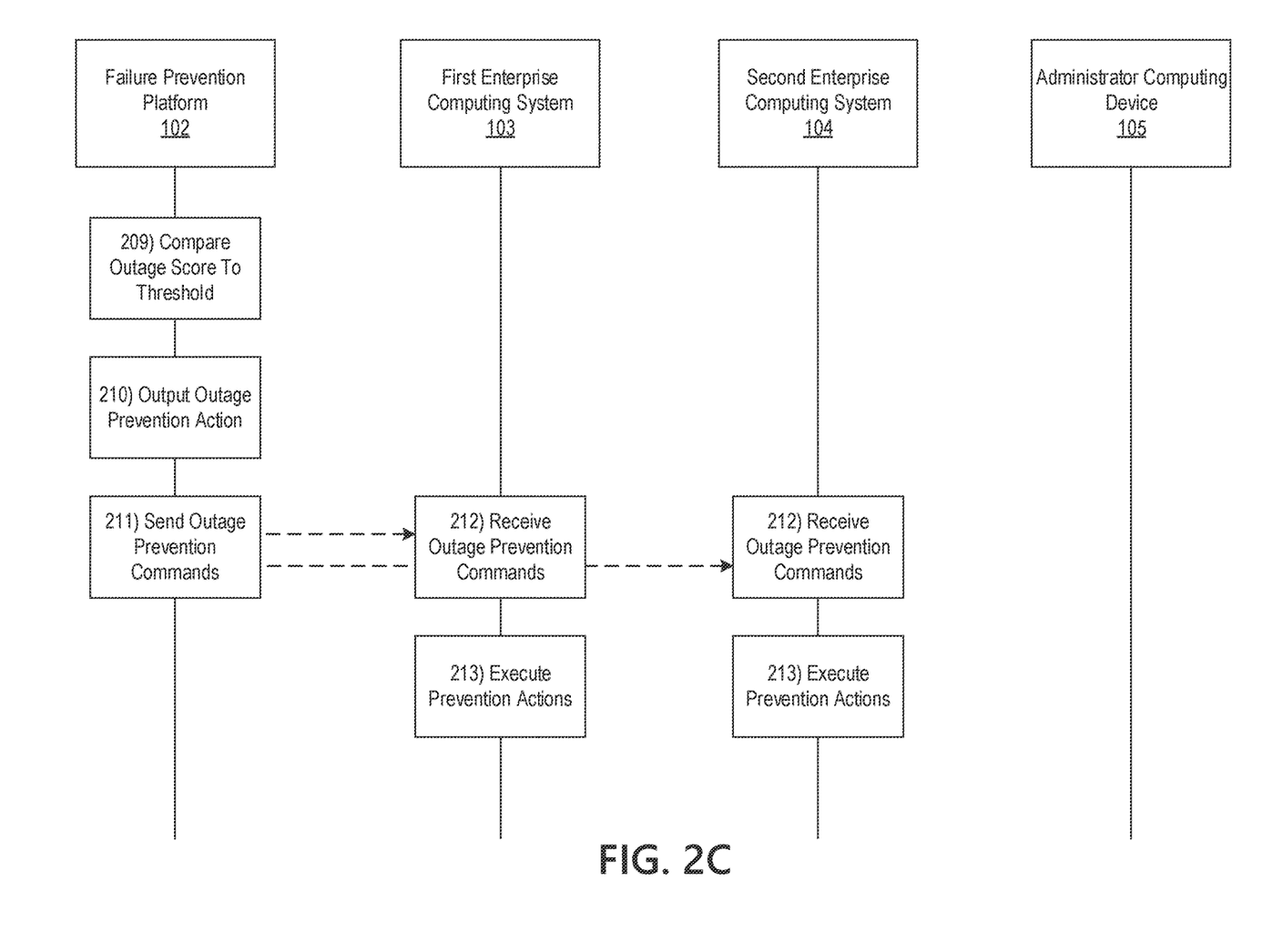

Referring to FIG. 2C, at step 209, the failure prevention platform 102 may compare the likelihood of outage score to an outage threshold. For example, the failure prevention platform 102 may have set an outage threshold value of 0.5. If the failure prevention platform 102 identifies that the likelihood of outage score meets or exceeds the outage threshold, the failure prevention platform 102 may proceed to step 210. Otherwise, if the failure prevention platform 102 identifies that the likelihood of outage score does not meet the outage threshold, the failure prevention platform 102 may return to step 205 to continue monitoring systems for current parameter information.

At step 210, the failure prevention platform 102 may output an outage prevention action. For example, the failure prevention platform 102 may have stored, along with the historical failure information, a corresponding action taken to address the corresponding failure/outage. In these instances, the failure prevention platform 102 may output this corresponding action. Additionally or alternatively, the outage prediction model may include an action selection component or model, which may identify, based on the conditions leading to the failure prediction, a mitigating action. For example, if CPU usage percentage is becoming too high, the outage prediction model may have been trained to automatically stop acceptance of additional requests and/or to distribute current tasks so as to reduce the usage percentage. As another example, if CPU Fahrenheit/Celsius value percentage is becoming too high, the outage prediction model may identify that a fan or other cooling system should be activated and/or that processing should be reduced. In some instances, this action selection model may be trained to include rules to prevent increase in each of the various parameter percentages (e.g., by receiving manual rules similar to those noted above for CPU usage and/or Fahrenheit/Celsius value). Additionally or alternatively, the failure prevention platform 102 may dynamically and continuously learn over time so as to refine such rules (e.g., exactly how much task distribution should be performed, so as to maintain maximum system efficiency without experiencing failure/outage, and/or other similar refinements).

At step 211, once the outage prevention action has been identified at step 210, the failure prevention platform 102 may send one or more commands directing the first enterprise computing system 103 and/or the second enterprise computing system 104 to execute the outage prevention action. In some instances, the failure prevention platform 102 may send the outage prevention commands to the first enterprise computing system 103 and/or the second enterprise computing system 104 via the communication interface 113 and while the first and/or second wireless data connections are established.

In some instances, the failure prevention platform 102 may send the commands to the system for which a failure is predicted. Additionally or alternatively, the failure prevention platform 102 may send the commands to a different system. For example, the failure prevention platform 102 may send commands to a load balancing device associated with the first enterprise computing system 103 and/or the second enterprise computing system 104, directing the load balancing device to direct queries or other requests away from the system for which failure is predicted (e.g., first enterprise computing system 103), and instead route them to another system (e.g., second enterprise computing system 104). In some instances, in addition or as an alternative to directing a load balancer device, the failure prevention platform 102 may send commands to the other system (e.g., second enterprise computing system 104) directly.

At step 212, the first enterprise computing system 103 and/or the second enterprise computing system 104 may receive the outage prevention commands sent at step 211. For example, the first enterprise computing system 103 and/or the second enterprise computing system 104 may receive the outage prevention commands while the first and/or second wireless data connection is established.

At step 213, based on or in response to the one or more commands directing the first enterprise computing system 103 and/or the second enterprise computing system 104 to execute the outage prevention action, the first enterprise computing system 103 and/or the second enterprise computing system 104 may execute the outage prevention action(s). For example, the first enterprise computing system 103 and/or the second enterprise computing system 104 may initiate a cooling system (e.g., to reduce Fahrenheit/Celsius values), distribute tasks and/or decline additional tasks (e.g., to reduce processing load), distribute stored and/or cached data (e.g., to reduce memory and/or cache storage), and/or execute other actions. Additionally or alternatively, the first enterprise computing system 103 and/or the second enterprise computing system 104 may perform actions to compensate for the system at which failure is predicted (e.g., initiate additional tasks, increase usage, and/or perform other actions).

Figure 2D:
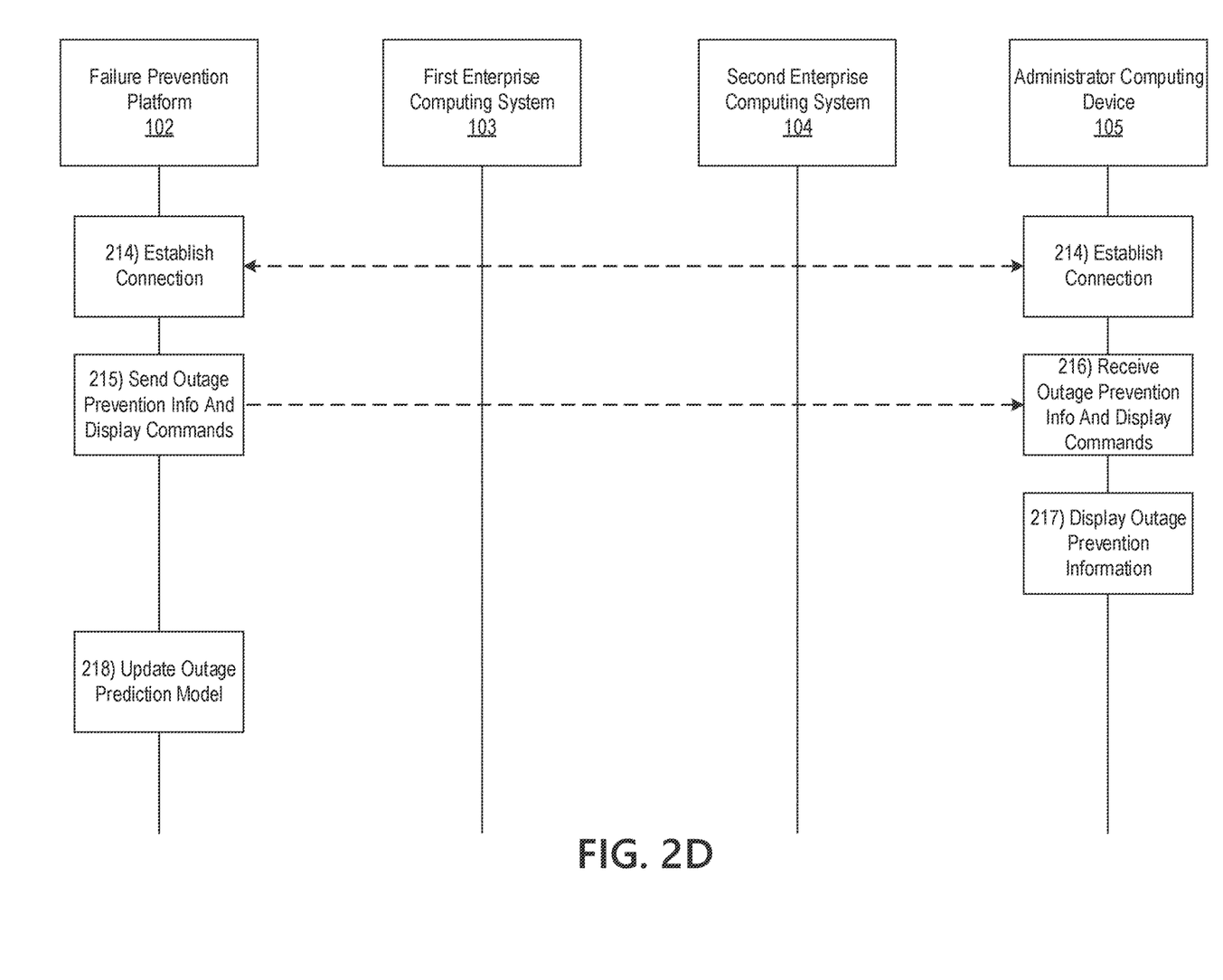

With reference to FIG. 2D, at step 214, the failure prevention platform 102 may establish a connection with the administrator computing device 105. For example, the failure prevention platform 102 may establish a third wireless data connection with the administrator computing device 105 to link the failure prevention platform 102 to the administrator computing device 105 (e.g., in preparation for sending outage prevention information).

At step 215, the failure prevention platform 102 may send outage prevention information to the administrator computing device 105. For example, the failure prevention platform 102 may send information identifying one or more systems for which failure is predicted. In some instances, the failure prevention platform 102 may also send one or more commands directing the administrator computing device 105 to display the outage prevention information. In some instances, the failure prevention platform 102 may send the outage prevention information to the administrator computing device 105 via the communication interface 113 and while the third wireless data connection is established.

At step 216, the administrator computing device 105 may receive the outage prevention information sent at step 215. For example, the administrator computing device 105 may receive the outage prevention information while the third wireless data connection is established. In some instances, the administrator computing device 105 may also receive one or more commands directing the administrator computing device 105 to display the outage prevention information.

Figure 4:
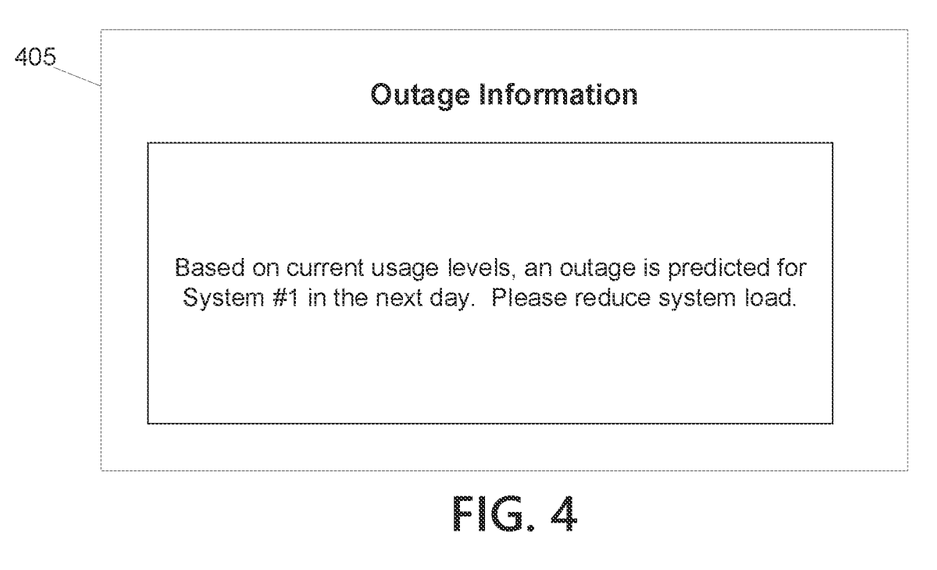
FIG. 4 depicts an illustrative graphical user interface for implementing a hybrid neural network for preventing system failure in accordance with one or more example embodiments.

At step 217, based on or in response to the one or more commands directing the administrator computing device 105 to display the outage prevention information, the administrator computing device 105 may display the outage prevention information. For example, the administrator computing device 105 may display a graphical user interface similar to graphical user interface 405 (which is shown in FIG. 4), identifying that a failure or outage is predicted for a particular system.

At step 218, the failure prevention platform 102 may update the outage prediction model. For example, the failure prevention platform 102 may update the outage prediction model based on any feedback received from the administrator computing device 105 (e.g., user input indicating whether or not a prediction was correct) and/or the current parameter information. For example, the failure prevention platform 102 may feed the current parameter information back into the outage prediction model to dynamically and continuously refine the outage prediction model, and to improve accuracy of its outage prediction. For example, by establishing a dynamic feedback loop, the failure prevention platform 102 may enable the outage prediction model to continuously learn new patterns and/or parameter values that may be indicative of system failures.

Figure 3:
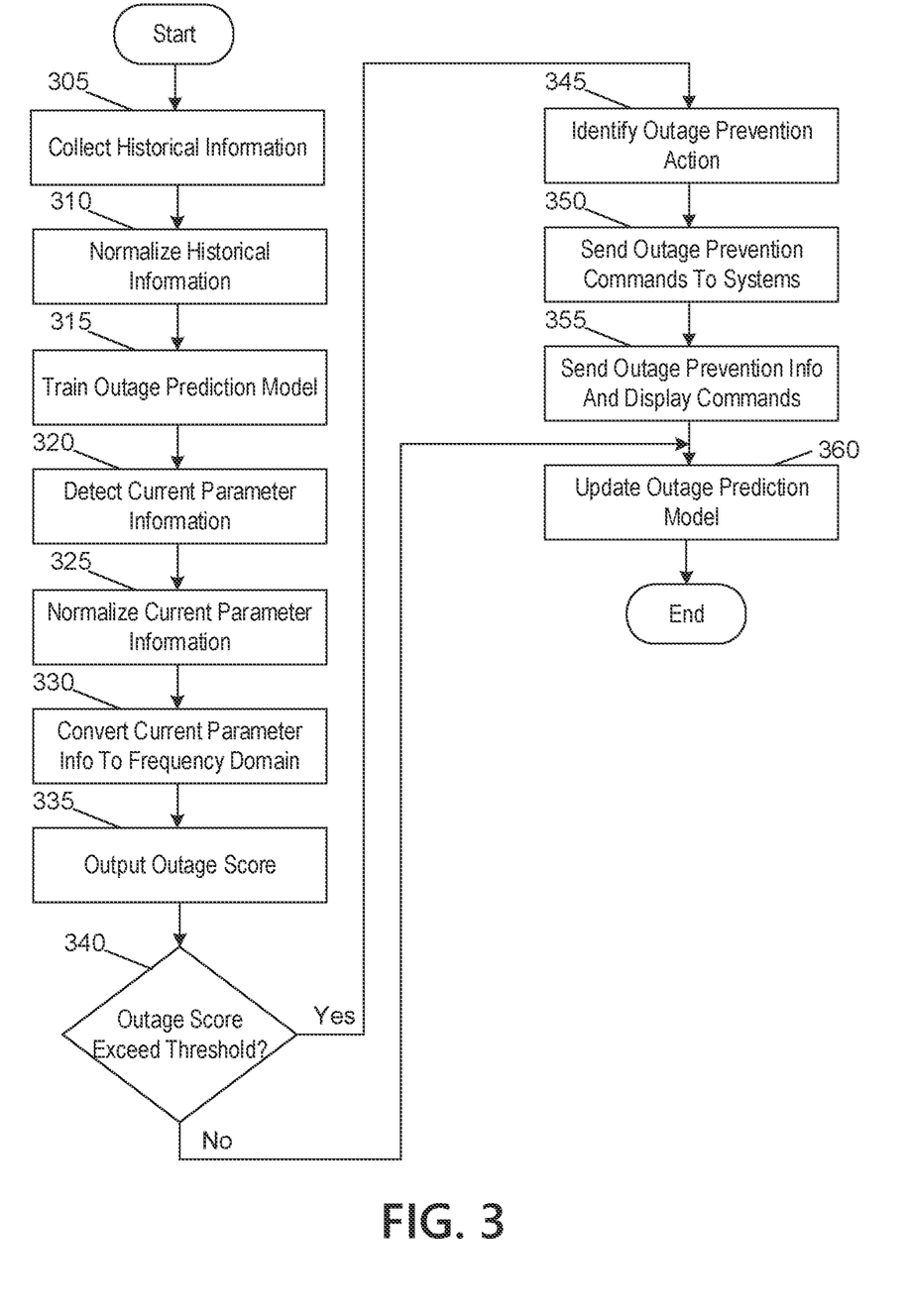
FIG. 3 depicts an illustrative method for implementing a hybrid neural network for preventing system failure in accordance with one or more example embodiments.

FIG. 3 depicts an illustrative method for implementing a hybrid neural network for preventing system failure in accordance with one or more example embodiments. Referring to FIG. 3, at step 305, a computing platform having at least one processor, a communication interface, and memory may collect historical parameter information. At step 310, the computing platform may normalize the historical parameter information. At step 315, the computing platform may train an outage prediction model to forecast system outages. At step 320, the computing platform may detect current parameter information. At step 325, the computing platform may normalize the current parameter information. At step 330, the computing platform may convert the current parameter information to the frequency domain, and input it into a CNN of the outage prediction model. At step 335, the computing platform may input the output from the CNN into one or more RNNs to output a likelihood of outage score. At step 340, the computing platform may compare the likelihood of outage score to an outage threshold. Based on identifying that the likelihood of outage score meets or exceeds the outage threshold, the computing platform may proceed to step 345. Otherwise, if the outage threshold is not exceeded, the computing platform may proceed to step 360.

At step 345, the computing platform may identify an outage prevention action. At step 350, the computing platform may send one or more commands directing system(s) to execute the outage prevention action. At step 355, the computing platform may send one or more commands directing an administrator device to display outage prevention information. At step 360, the computing platform may update the outage prediction model.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
   train, using historical parameter information and historical outage information, an outage prediction model configured to identify likelihood of outage scores, indicating likelihoods of at least one system experiencing an outage within a predetermined period of time, wherein the outage prediction model comprises a convolutional neural network (CNN) and at least one recurrent neural network (RNN);
   receive, from the at least one system, current parameter information;
   normalize the current parameter information to provide a uniform format for each type of parameter information of the current parameter information;
   convert, using the CNN of the outage prediction model, the normalized current parameter information from a geometric domain to a frequency domain;
   input, into the at least one RNN of the outage prediction model, the frequency domain normalized current parameter information, to produce a likelihood of outage score for the at least one system;
   compare the likelihood of outage score for the at least one system to a predetermined outage threshold; and
   based on identifying that the likelihood of outage score meets or exceeds the predetermined outage threshold, send one or more commands directing the at least one system to execute a performance modification to prevent a predicted outage, wherein sending the one or more commands directing the at least one system to execute the performance modification to prevent the predicted outage causes the at least one system to execute the performance modification.

2. The computing platform of claim 1, wherein the historical parameter information and the current parameter information indicate one or more of: computer processing unit (CPU) Fahrenheit/Celsius values, CPU load, cache usage, or memory usage.

3. The computer platform of claim 1, wherein the memory stores additional computer-readable instructions that, when executed by the at least one processor, further cause the computing platform to:
   normalize, prior to inputting the historical parameter information into the outage prediction model, the historical parameter information.

4. The computing platform of claim 3, wherein normalizing the historical parameter information and the current parameter information comprises:
   configuring all types of parameter information included in the historical parameter information and the current parameter information with a uniform format, wherein all of the types of the parameter information may be directly compared to each other once converted to the uniform format.

5. The computing platform of claim 4, wherein the uniform format comprises a percentage.

6. The computing platform of claim 1, wherein the at least one RNN is trained to identify matching patterns between the historical parameter information and the current parameter information, wherein identifying the matching patterns comprises identifying at least one matching progression of changes in one or more parameters.

7. The computing platform of claim 6, wherein the at least one matching progression of changes comprises changes in parameters at different systems.

8. The computing platform of claim 6, wherein the at least one RNN is trained to identify a subset of the matching patterns that correspond to the historical outage information, wherein the likelihood of outage score is produced based on whether or not any of the identified matching patterns correspond to the historical outage information.

9. The computing platform of claim 8, wherein the memory stores additional computer-readable instructions that, when executed by the at least one processor, further cause the computing platform to:
   identify, using the outage prediction model, the performance modification, wherein identifying the performance modification comprises identifying a historical performance modification that was executed in response to previous identification of the corresponding identified matching pattern.

10. The computing platform of claim 1, wherein the outage prediction model is configured to identify the likelihood of outage scores based on a plurality of parameters across a plurality of systems.

11. The computing platform of claim 1, wherein sending one or more commands directing the at least one system to execute the performance modification causes the at least one system to perform one or more of:
    reducing a CPU Fahrenheit/Celsius value,
    reducing a CPU load,
    reducing a cache usage, or
    reducing a memory usage.

12. The computing platform of claim 11, wherein the one or more commands are sent to a load balancing system, different than the at least one system.

13. A method comprising:
    at a computing platform comprising at least one processor, a communication interface, and memory:

training, using historical parameter information and historical outage information, an outage prediction model configured to identify likelihood of outage scores, indicating likelihoods of at least one system experiencing an outage within a predetermined period of time, wherein the outage prediction model comprises a convolutional neural network (CNN) and at least one recurrent neural network (RNN);

receiving, from the at least one system, current parameter information;

normalizing the current parameter information to provide a uniform format for each type of parameter information of the current parameter information;

converting the normalized current parameter information from a geometric domain to a frequency domain;

inputting, into the CNN and at least one RNN of the outage prediction model, the frequency domain normalized current parameter information, to produce a likelihood of outage score for the at least one system;

comparing the likelihood of outage score for the at least one system to a predetermined outage threshold; and based on identifying that the likelihood of outage score meets or exceeds the predetermined outage threshold, sending one or more commands directing the at least one system to execute a performance modification to prevent a predicted outage, wherein sending the one or more commands directing the at least one system to execute the performance modification to prevent the predicted outage causes the at least one system to execute the performance modification.

14. The method of claim 13, wherein the historical parameter information and the current parameter information indicate one or more of: computer processing unit (CPU) Fahrenheit/Celsius value, CPU load, cache usage, or memory usage.

15. The method of claim 13, further comprising:
normalizing, prior to inputting the historical parameter information into the outage prediction model, the historical parameter information.

16. The method of claim 15, wherein normalizing the historical parameter information and the current parameter information comprises:
configuring all types of parameter information included in the historical parameter information and the current parameter information with a uniform format, wherein all of the types of the parameter information may be directly compared to each other once converted to the uniform format.

17. The method of claim 16, wherein the uniform format comprises a percentage.

18. The method of claim 13, wherein the at least one RNN is trained to identify matching patterns between the historical parameter information and the current parameter information, wherein identifying the matching patterns comprises identifying at least one matching progression of changes in one or more parameters.

19. The method of claim 18, wherein the at least one matching progression of changes comprises changes in parameters at different systems.

20. One or more non-transitory computer-readable media storing instructions that, when executed by a computing platform comprising at least one processor, a communication interface, and memory, cause the computing platform to:
train, using historical parameter information and historical outage information, an outage prediction model configured to identify likelihood of outage scores, indicating likelihoods of at least one system experiencing an outage within a predetermined period of time, wherein the outage prediction model comprises a convolutional neural network (CNN) and at least one recurrent neural network (RNN);

receive, from the at least one system, current parameter information;

normalize the current parameter information to provide a uniform format for each type of parameter information of the current parameter information;

convert the normalized current parameter information from a geometric domain to a frequency domain;

input, into the CNN and at least one RNN of the outage prediction model, the frequency domain normalized current parameter information, to produce a likelihood of outage score for the at least one system;

compare the likelihood of outage score for the at least one system to a predetermined outage threshold; and based on identifying that the likelihood of outage score meets or exceeds the predetermined outage threshold, send one or more commands directing the at least one system to execute a performance modification to prevent a predicted outage, wherein sending the one or more commands directing the at least one system to execute the performance modification to prevent the predicted outage causes the at least one system to execute the performance modification.

* * * * *